(12) United States Patent
Busaba et al.

(10) Patent No.: US 8,904,102 B2
(45) Date of Patent: *Dec. 2, 2014

(54) PROCESS IDENTIFIER-BASED CACHE INFORMATION TRANSFER

(71) Applicant: International Business Machines Corporation, Armonk, NY (US)

(72) Inventors: Fadi Y. Busaba, Poughkeepsie, NY (US); Steven R. Carlough, Wappingers Falls, NY (US); Christopher A. Krygowski, Lagrangeville, NY (US); Brian R. Prasky, Wappingers Falls, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/783,794

(22) Filed: Mar. 4, 2013

(65) Prior Publication Data

US 2013/0332672 A1 Dec. 12, 2013

Related U.S. Application Data

(63) Continuation of application No. 13/493,636, filed on Jun. 11, 2012.

(51) Int. Cl.
*G06F 12/02* (2006.01)
*G06F 17/30* (2006.01)
*G06F 12/12* (2006.01)

(52) U.S. Cl.
CPC .......... *G06F 17/30982* (2013.01); *G06F 12/12* (2013.01)
USPC .......................................... 711/108; 711/118

(58) Field of Classification Search
CPC .......... G06F 2201/865; G06F 11/3466; G06F 12/0866; G06F 12/0842; G06F 12/12; G06F 17/30982; G06F 2201/885; G06F 2201/86; G06F 12/0811; G06F 12/0895
USPC ................................................... 711/108, 118
See application file for complete search history.

(56) References Cited

U.S. PATENT DOCUMENTS 7,231,470 B2    6/2007    Huggahalli et al.
7,895,415 B2    2/2011    Gonzalez et al.

(Continued)

OTHER PUBLICATIONS

Iyer. R. (2003). On Modeling and Analyzing Cache Hierarchies Using Casper. 11th IEEE/ACM International Symposium on Modeling, Analysis and Simulation of Computer Telecommunications Systems (MASCOTS 2003), pp. 182-187. Doi: 10. 1109/MASCOT. 2003.1240655.

*Primary Examiner* — Hashem Farrokh
(74) *Attorney, Agent, or Firm* — Cantor Colburn LLP; Margaret McNamara (57) ABSTRACT

Embodiments of the invention relate to process identifier (PID) based cache information transfer. An aspect of the invention includes sending, by a first core of a processor, a PID associated with a cache miss in a first local cache of the first core to a second cache of the processor. Another aspect of the invention includes determining that the PID associated with the cache miss is listed in a PID table of the second cache. Yet another aspect of the invention includes based on the PID being listed in the PID table of the second cache, determining a plurality of entries in a cache directory of the second cache that are associated with the PID. Yet another aspect of the invention includes pushing cache information associated with each of the determined plurality of entries in the cache directory from the second cache to the first local cache.

8 Claims, 9 Drawing Sheets

(56) References Cited

U.S. PATENT DOCUMENTS

| | | | |
|---|---|---|---|
| 8,392,657 B2 * | 3/2013 | Zhao et al. | 711/121 |
| 2004/0103251 A1 | 5/2004 | Alsup | |
| 2011/0055482 A1 | 3/2011 | So et al. | |
| 2011/0087843 A1 | 4/2011 | Zhao et al. | |
| 2011/0093687 A1 | 4/2011 | Chen et al. | |
| 2011/0161589 A1 | 6/2011 | Guthrie et al. | |
| 2011/0161597 A1 | 6/2011 | Tremaine et al. | |
| 2011/0231593 A1 * | 9/2011 | Yasufuku et al. | 711/3 |
| 2012/0246408 A1 * | 9/2012 | Yamamura et al. | 711/125 |

\* cited by examiner

| LOCAL CACHE DIRECTORY 100A | |
|---|---|
| PID 101 | ADDRESS TAG 102 |
| | |
| | |
| | |
| | |
| | |
| | |

FIG. 1A

| SHARED CACHE DIRECTORY 100B | | |
|---|---|---|
| CORE ID 103 | PID 101 | ADDRESS TAG 102 |
| | | |
| | | |
| | | |
| | | |
| | | |
| | | |

FIG. 1B

| PID TABLE 100C | | |
|---|---|---|
| PID 101 | | |

PROCESS IDENTIFIER-BASED CACHE INFORMATION TRANSFER

CROSS-REFERENCE TO RELATED APPLICATION

This application is a continuation of U.S. application Ser. No. 13/493,636 (Busaba et al.), filed on Jun. 11, 2012, which is herein incorporated by reference in its entirety.

BACKGROUND

The present invention relates generally to computing systems, and more specifically, to process identifier (PID) based transferring of cache information between caches in a multiprocessor computer processor.

A processor subsystem in a computing system may include multiple processor chips. There may be multiple processor cores on a single processor chip. Such multicore chips are used for many types of computing systems, including but not limited to desktops, servers, smartphones, and tablets. Caching is used in a processor subsystem to allow frequently-used data (for example, instruction data or operand data), to be easily accessed by a processor core without needing to search in a main memory of the computing system, thereby increasing the speed of processor operations. The cores in a processor subsystem may each have respective local caches, and cores on the same chip may additionally share a common higher-level cache. The local caches may be private, or may be shared with other processor cores in the subsystem in various topologies, for example, ring, bus or mesh.

When a core makes an access to its local cache, the core may find that the data it needs is not in the core's local cache (i.e., there is a local cache miss). The data may instead be located in another shared or local cache on the same chip or on another chip. The core that experienced the local cache miss may make a cache line transfer request to the cache subsystem to fetch the desired data to its local cache. Fetching of data from one cache to another may be a master/slave relationship. The core that needs the data is the master and makes the request to the cache subsystem, which is the slave. The cache subsystem may then locate the data in a particular local cache and returns it to the requestor. The most recent value of a particular storage location may be determined by the cache subsystem, and then be sent to the requester. The location process may involve determining whether the desired data already exists within the subsystem; if the data does not already exist within the cache subsystem the data may need to be retrieved from the main memory of the computing system. Intra-cache data transfers may be maintained on a per cache line basis and may be governed by cache protocols that are adapted by the particular processor to fit its architecture and design requirements.

SUMMARY

Embodiments include a method for process identifier (PID) based cache information transfer. An aspect of the invention includes sending, by a first core of a processor, a PID associated with a cache miss in a first local cache of the first core to a second cache of the processor. Another aspect of the invention includes determining that the PID associated with the cache miss is listed in a PID table of the second cache. Yet another aspect of the invention includes based on the PID being listed in the PID table of the second cache, determining a plurality of entries in a cache directory of the second cache that are associated with the PID. Yet another aspect of the invention includes pushing cache information associated with each of the determined plurality of entries in the cache directory from the second cache to the first local cache.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Process identifier (PID) based cache information transfer is provided, with exemplary embodiments being discussed below in detail. A particular process may begin executing on a first core in the multiprocessor system, and then later be transferred to a second core. A process transfer may occur if, for example, the process pauses, and the first core is busy with another task when the process needs to continue execution and the second core is available for taking on the process. In such a situation, any cache lines regarding the process may located in a cache associated with the first core, so that the second core may be required to make multiple cache line transfer requests for the cache information regarding the process from the cache associated with the first core during execution of the process. Therefore, to avoid making multiple cache line transfer requests by the second core, the first core may preemptively transfer cache information in its associated cache that are associated with the process to the second core's local cache. This transfer may be performed based on the PID of the process. Such a transfer may allow a core to pre-fetch necessary cache information when a software process is migrated to the core from another core, and thus reduce cache miss performance penalties.

In some embodiments, all cache line data from one core's local cache memory associated with a given PID may be transferred to a requesting core. In other embodiments, only line addresses associated with a given PID may be transferred to the requesting core, and the requesting core may later fetch content at its own discretion for any of the transferred addresses during execution of the process associated with the given PID. Transferring only the addresses, instead of actual cache line data, allows for reduced communication bandwidth. In addition, the core that is sending the data to the requesting core does not need to look into its local cache memory for the line content, and the requesting core does not need to actively block off its directory or cache lookup cycles to capture the incoming lines, thereby saving core processing cycles.

PID-based cache information transfer between caches in a multiprocessor system may be performed in various cache topologies. In a first embodiment, cache information may be transferred between two local private caches. In such an embodiment, the caches of the two cores talk directly to each other, and there is no higher-level common cache that both cores may access. This is discussed in further detail below with respect to FIGS. 1A, 3, 4, and 5. In another embodiment, two cores on the same chip may communicate through a higher-level common cache that is shared across both cores, such as an on-chip shared level-2 cache. This is discussed in further detail below with respect to FIGS. 1B, 6, and 7.

Figure 1A:
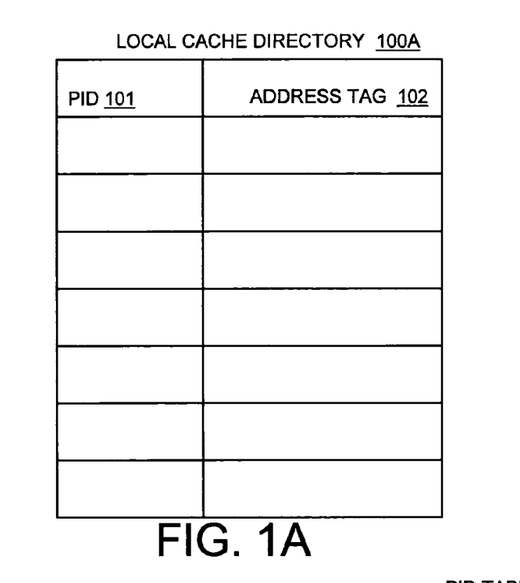
FIGS. 1A-C depict a local cache directory, a shared cache directory, and a PID table in accordance with various embodiments.
Figure 1B:
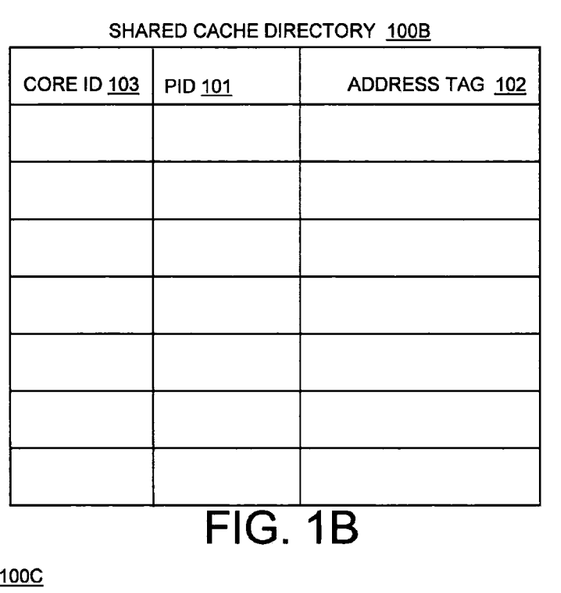
Figure 1C:
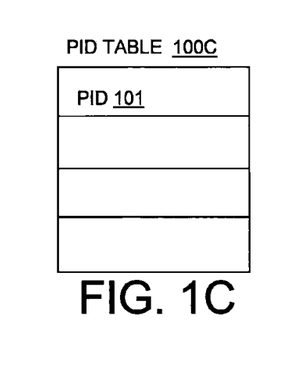

A cache may comprise local storage, a directory, and a PID table. The local storage may comprise a plurality of lines, each line comprising an instance of data (which may be, for example, an instruction, an operand, or a multiple thereof) associated to a storage address. The directory may comprise a listing of address tags corresponding to the valid entries in the local storage, an associated PID, and in embodiments in which the cache comprises a shared cache, a core identifier (core ID) for each entry. FIGS. 1A-B illustrate embodiments of cache directories 100A and 100B for PID-based cache information transfer. Cache directory 100A comprises an embodiment of a directory for a local cache, and has a plurality of entries, each entry comprising a PID 101 and address tag 102. Cache directory 100B comprises an embodiment of a directory for a shared cache, and also has a plurality of entries, each entry comprising a PID 101 and an address tag 102, and additionally comprising a core ID 103. The PID table lists the PIDs that have entries in the cache directory. The PID table may further comprise a number of entries that exist in the directory for each PID in some embodiments. The PID table comprises a relatively small memory, and may be a content addressable memory (CAM) in some embodiments. There may be a hardware limit for the number of PIDs that are listed in a PID table; this hardware limit may be based on the size of the cache, and may be any appropriate number. FIG. 1C illustrates an embodiment of a PID table 100C comprising a plurality of entries, each entry comprising a PID 101. A PID table such as PID table 100C may be incorporated into a shared cache or a local cache in various embodiments. When a core requests cache information regarding a given PID from another shared or local cache, the other shared or local cache's PID table may be checked before the cache directory to determine whether any data for a given PID exists in the cache, thereby reducing search time in the cache directory in the event that data associated with the PID is not in the cache.

Figure 2:
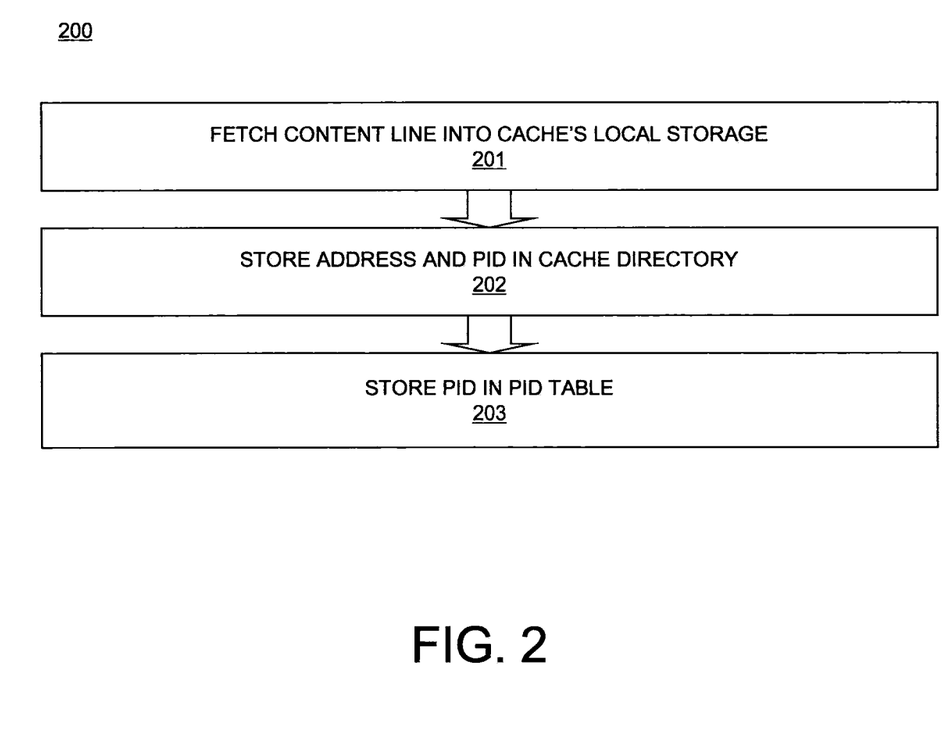
FIG. 2 depicts a process flow for storing data in a cache comprising a PID table in accordance with an embodiment.

FIG. 2 shows a flowchart of an embodiment of a method 200 for storing data in a cache comprising a PID table, such as PID table 100C of FIG. 1C, and a cache directory, such as either of cache directories 100A or 100B of FIGS. 1A-B. In block 201, a line of the data corresponding to an associated address is fetched from the cache subsystem into the cache's local storage. In block 202, the address tag 102 of the fetched data and the PID 101 of the software process that initiated the fetch of the data are stored in the cache directory 100A or 100B. In embodiments in which the cache comprises a shared cache, a core ID 103 may also be stored for the entry as shown in cache directory 100B, identifying the core that is executing the process associated with the PID 101. Lastly, in block 203, the PID 101 is stored in the cache PID table 100C, so that the PID table 100C may track which PIDs 101 are stored in the cache directory 100A or 100B. In some embodiments, a number of instances of each PID that exist in the cache directory 100A or 100B may also be stored and maintained in the PID table 100C.

Figure 3:
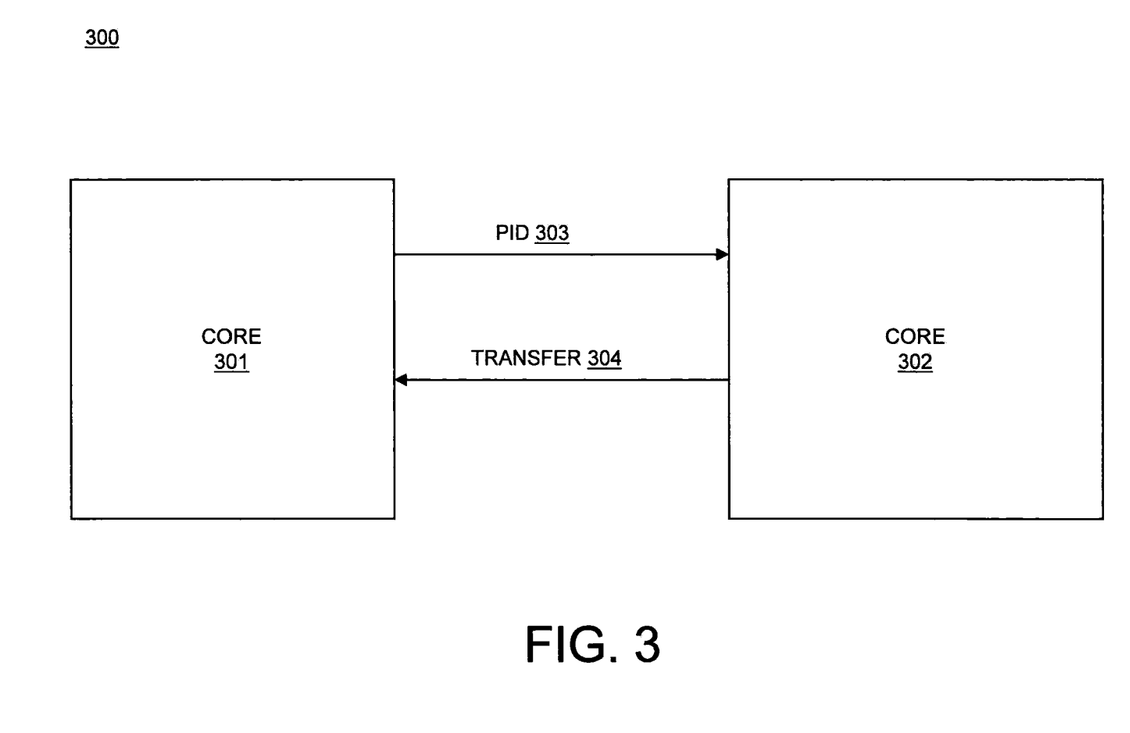
FIG. 3 depicts a PID-based transfer in a multiprocessor system to a first local cache from a second local cache in accordance with an embodiment.

FIG. 3 illustrates an embodiment of a PID-based transfer in a multiprocessor system 300 from a first local cache to a second local cache. Core 301 and core 302 are each cores in a multicore processor system. Cores 301 and 302 may be on the same chip or on different chips in various embodiments. Each of cores 301 and 302 comprises an associated local cache (shown in further detail below with respect to FIG. 4). When core 301 has a miss in its local cache, core 301 sends a given PID 303 of the software process associated with the miss to core 302. Core 302 determines whether data related to the given PID 303 is in its local cache, and if data related to given PID 303 is in its local cache, transfers cache information comprising the addresses of the related data, and, in some embodiments, the data itself, to core 301 via transfer 304. In system 300, only a single core may execute a given process at a time; therefore, receipt of the given PID 303 by core 302 indicates that core 302 is no longer executing the process associated with the given PID 303.

Figure 4:
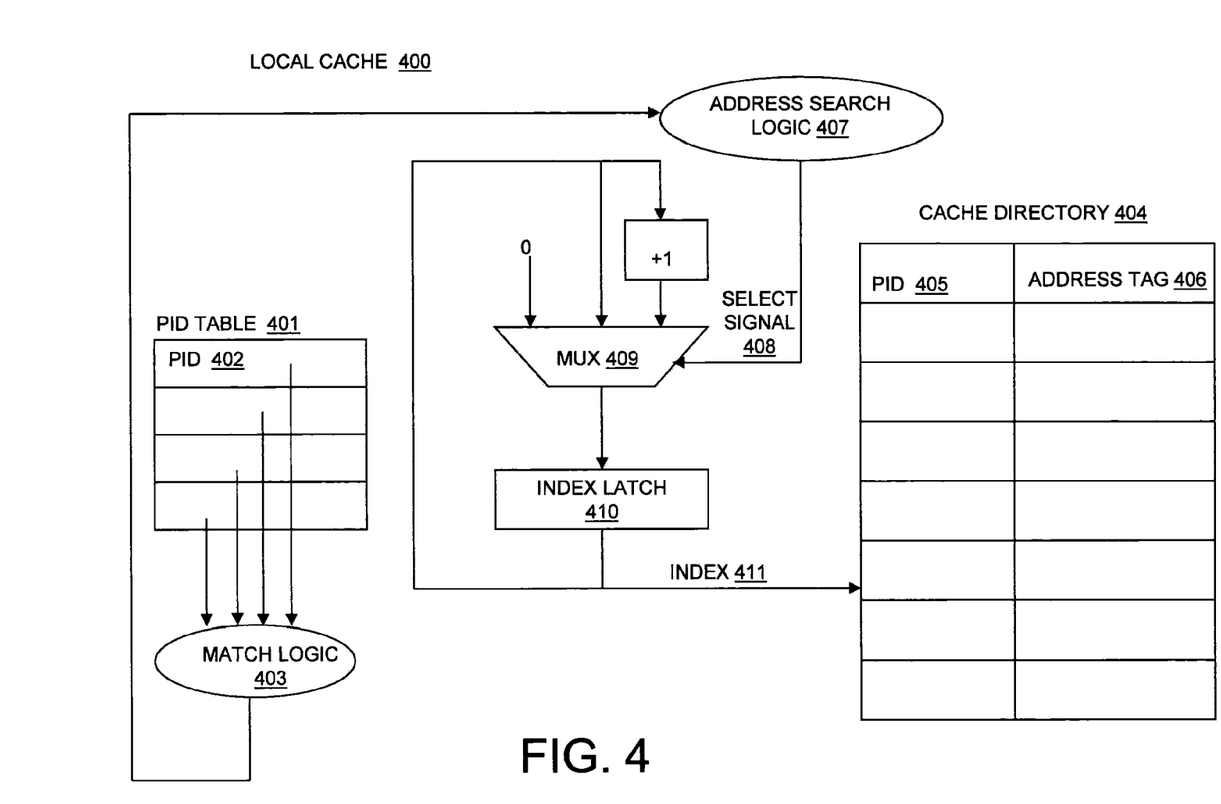
FIG. 4 depicts a local cache for PID-based cache information transfer to a first local cache from a second local cache in accordance with an embodiment.

FIG. 4 illustrates an embodiment of a local cache 400 for PID-based cache information transfer from a first local cache to a second local cache. Each of cores 301 and 302 of FIG. 3 may comprise a local cache 400 as shown in FIG. 4. The local cache 400 includes PID table 401 comprising a plurality of entries containing PIDs 402. Match logic 403 determines if a given PID received from another core is in the PID table 401. If the given PID is determined to be in the PID table 401 by match logic 403, the address search logic 407 is triggered. The address search logic 407 initiates a search of cache directory 404 for the given PID, via select signal 408, multiplexer 409 and index latch 410, which act to increment index 411 from zero to a number of entries in the cache directory 404. Index 411 is used to step through the plurality of entries (each of which comprises a PID 405 and address 406) in the cache directory 404 to search for any entries that are associated with the given PID. Any addresses 406 in entries that match the given PID are sent to the requesting core in an embodiment. Local cache 400 also includes local storage (not shown) that includes a plurality of lines, each line comprising data associated with a storage address. The data from the local storage associated with the addresses 406 in entries that match the given PID may additionally be sent to the requesting core in another embodiment.

Figure 5:
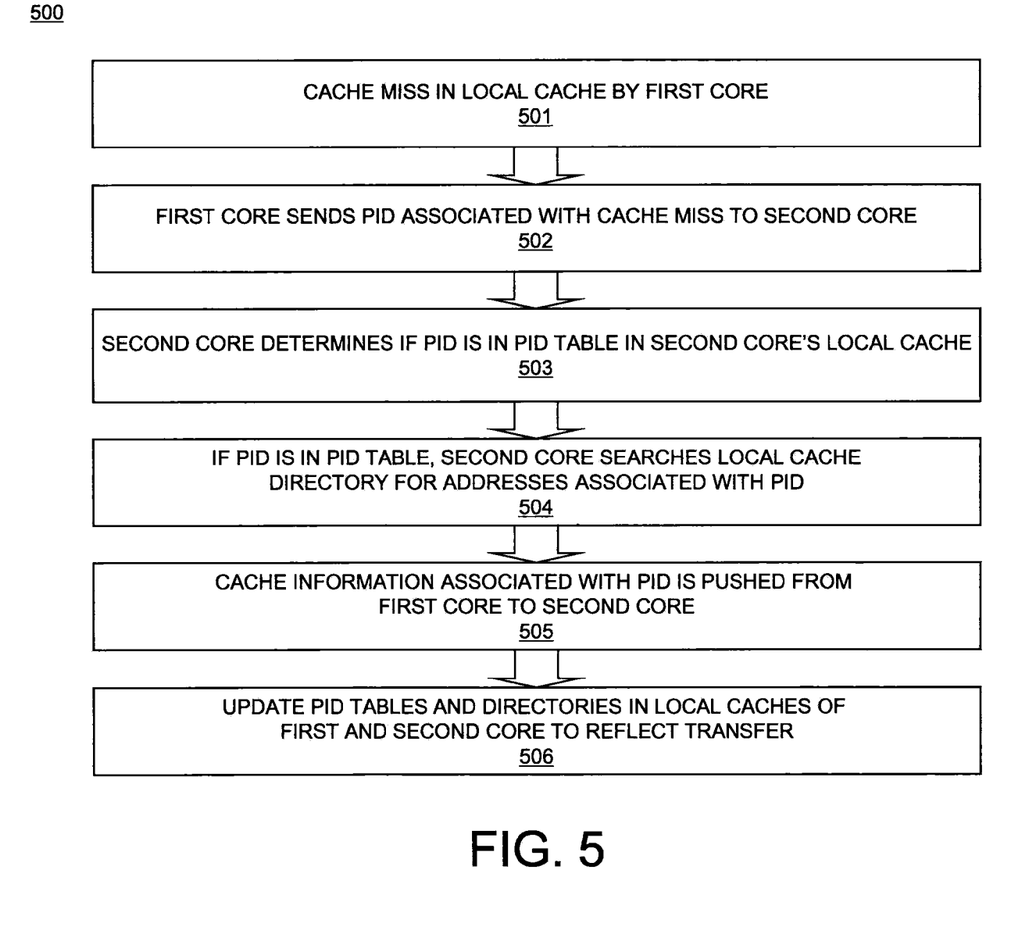
FIG. 5 depicts a process flow for PID-based cache information transfer to a first local cache from a second local cache in accordance with an embodiment.

FIG. 5 illustrates a flowchart of an embodiment of a method 500 for PID-based cache information transfer from a first local private cache to a second local private cache. FIG. 5 is discussed with respect to FIGS. 3 and 4. First, in block 501, core 301, in execution of a process having a PID 303, makes a cache fetch that misses its local cache. Next, in block 502, the PID 303 is sent by core 301 to core 302 to determine if any data associated with the PID 303 is in the local cache 400 of core 302. In block 503, the match logic 403 in the local cache 400 of core 302 searches PID table 401 for the given PID 303 to determine if local cache 400 contains any data associated with the given PID 303. Then, in block 504, if the given PID 303 is found in the PID table 401, the address search logic 407 is triggered to search cache directory 404 to determine any addresses that are in the directory that are associated with the given PID 303. Flow then proceeds to block 505 of method 500, in which a transfer 304 comprising a push of cache information associated with the given PID 303 is made from the cache directory 404 of core 302 to the local cache of core 301. In some embodiments, only the addresses 406 from the cache directory 304 in the local cache 400 of core 302 that are associated with the given PID 303 may be transferred to core 301, and the core 301 may later at its own discretion fetch content for any of the transferred addresses during execution of the process associated with the given PID 303. In other embodiments, any cache lines from the local storage relating to the PID 303 may be additionally transferred from core 302 to core 301 and installed in the local cache of core 301. Lastly, in block 506, the cache directory 404 and PID table 401 in each of the local caches of cores 301 and 302 are updated to reflect the transfer. The given PID 303 is added to the PID table 401 in the local cache 400 of core 301, and entries for the addresses received from core 302 are created in the cache directory 404 in the local cache of core 301 with the given PID 303. In local cache 400 of core 302, the given PID 303 is removed from the PID table 401. In some embodiment, any entries in the cache directory 404 associated with the given PID 303 in core 302 may also be removed. In another embodiment, only entries in non-shared states may be removed to allow cache lines that are shared among processes to remain in multiple caches.

Figure 6:
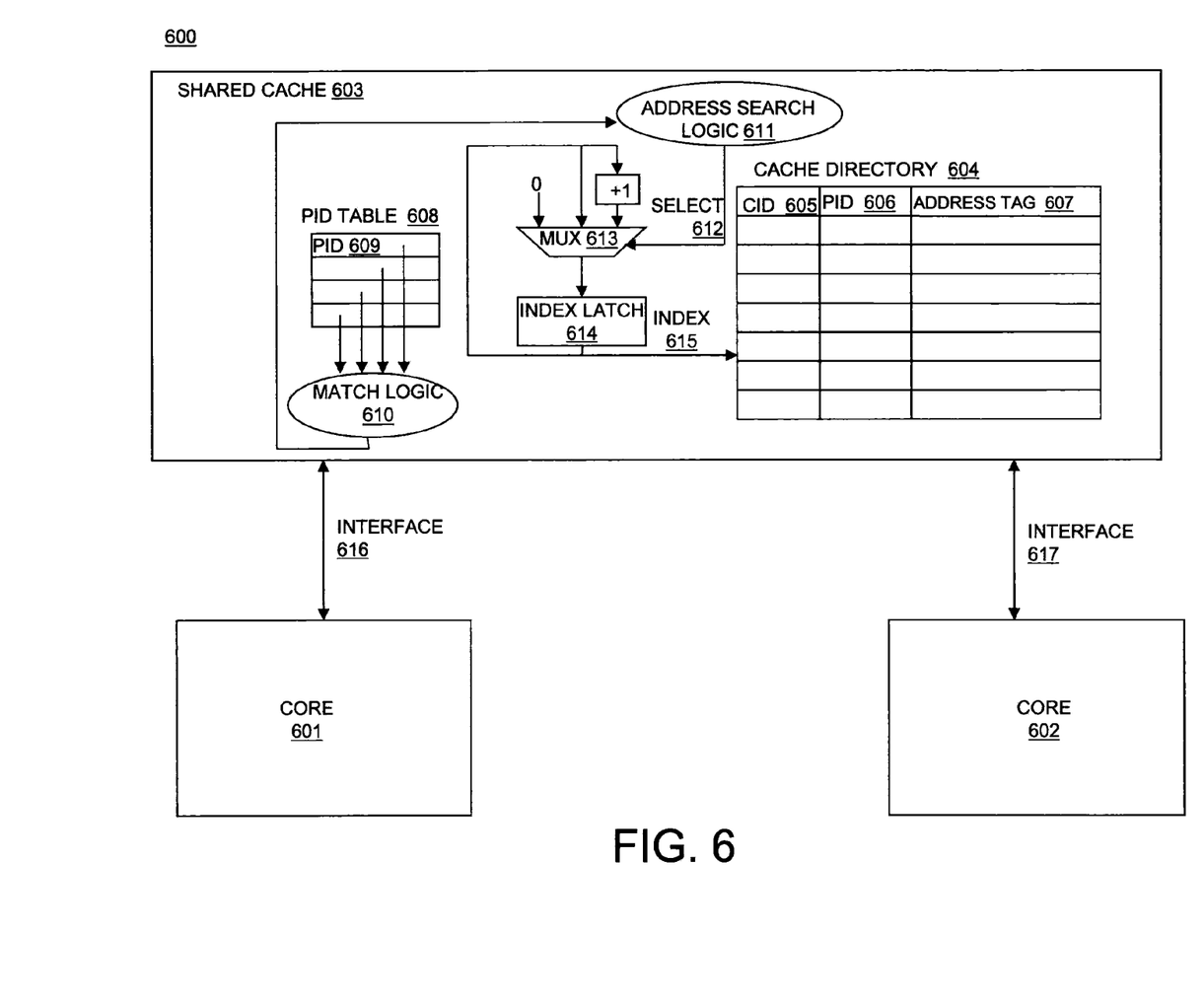
FIG. 6 depicts a system for PID-based cache information transfer from a shared cache to a local cache in accordance with an embodiment.

FIG. 6 illustrates an embodiment of a system 600 for PID-based cache information transfer from a shared cache 603 to a local cache. FIG. 6 includes two cores 601 and 602; however, any appropriate number of cores may share a shared cache such as shared cache 603. Each of cores 601 and 602 also includes a respective local cache, which may comprise a local cache 400 as was shown in FIG. 4, in some embodiments. Each of cores 601 and 602 also comprises a respective interface 616 and 617 to communicate with shared cache 603. The shared cache 603 includes match logic 610, which determines if a given PID (which may be received as a request through interface 616 or 617 from either of cores 601 or 602) is in the PID table 608, which comprises a plurality of PIDs 609. If the given PID is determined to be in the PID table 608 by match logic 610, the address search logic 611 is triggered. The address search logic 611 initiates a search of cache directory 604 for the given PID, via select signal 612, multiplexer 613 and index latch 614, which act to increment index 615 from zero to a number of entries in the cache directory 604. Index 615 is used to step through the plurality of entries (each of which comprises a PID 606 and address 607) in the cache directory 604 to search for any entries associated with the given PID. The addresses 607 in entries that match the given PID are sent to the requesting core in an embodiment. Each entry in the cache directory 604 additionally comprises a core ID (CID) 605 that indicates a particular core, of the cores that share the shared cache 603, that may have data for that entry. Shared cache 603 also includes a local storage (not shown) that includes a plurality of lines, each line comprising data associated with an address. Any addresses 607 from the local storage of the shared cache of the core corresponding to the CID 605 in an entry matching the given PID may be additionally sent to the requesting core in another embodiment.

Figure 7:
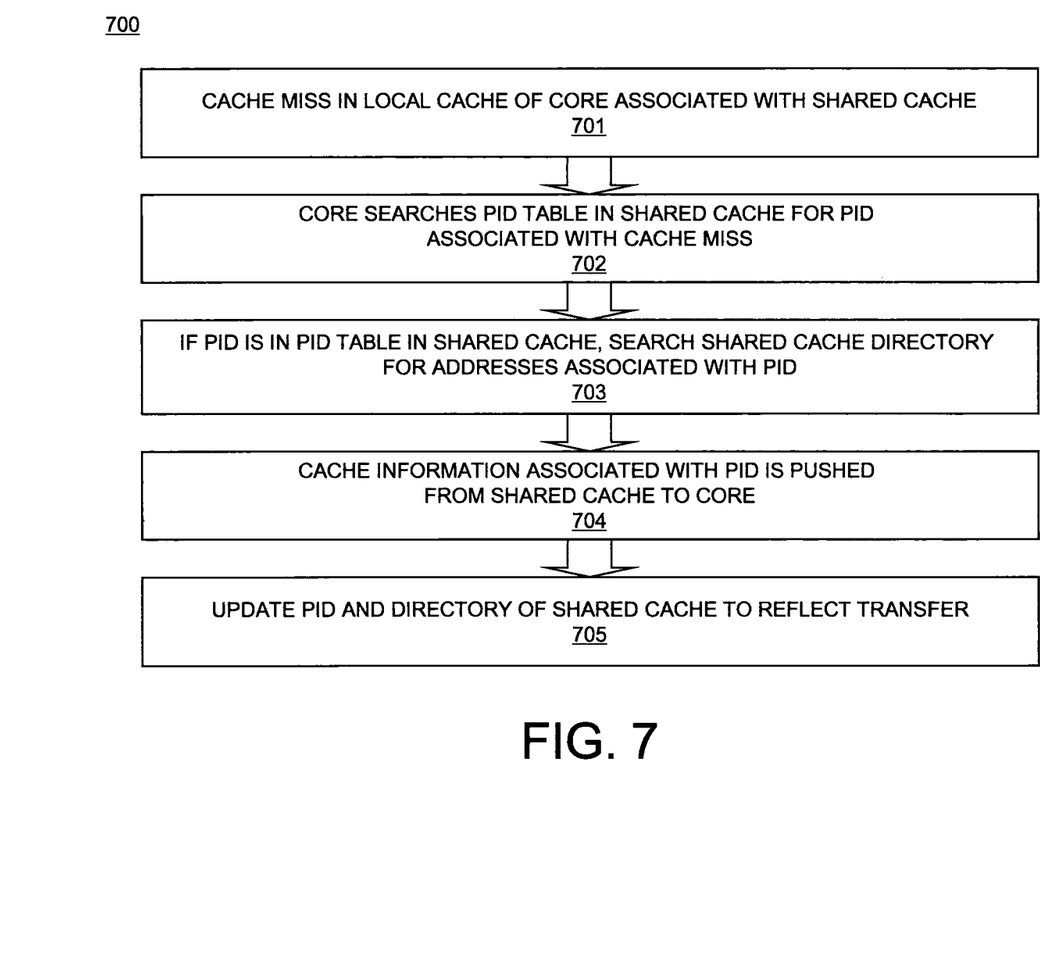
FIG. 7 depicts a process flow for PID-based cache information transfer from a shared cache to a local cache in accordance with an embodiment.

FIG. 7 illustrates a flowchart of an embodiment of a method 700 for PID-based cache information transfer from a shared cache to a local private cache. FIG. 7 is discussed with respect to FIG. 6. First, in block 701, core 601, in execution of a process having a PID, makes a cache fetch associated with a given PID that misses its local cache. Next, in block 702, core 601 searches, via interface 616, the PID table 608 in the shared cache 603 for the given PID associated with the cache miss to determine if any cache information for the given PID exists in shared cache 603. Then, in block 703, if the given PID is found in the PID table 608 in the shared cache 603, the address search logic 611 is triggered to search the cache directory 604 for the given PID to determine whether any addresses 607 stored in the cache directory 604 are associated with the given PID. Flow then proceeds to block 704 of method 700, in which cache information associated with the given PID is pushed via interface 616 from cache directory 604 of the shared cache 603 to the local cache of core 601. In some embodiments, only the addresses 607 from the cache directory 604 in the shared cache 603 that are associated with the given PID may be transferred to core 601, and core 601 may later fetch content at its discretion for any of the transferred addresses during execution of the process associated with the given PID. In other embodiments, any cache lines from the local storage of the shared cache 603 relating to the given PID may be additionally transferred from shared cache 603 to core 601 and installed in the local cache of core 601. Lastly, in block 705, the core ID field(s) in the cache directory 604 in the shared cache 603 are updated to reflect the transfer of entries associated with the given PID to core 601. The directory and PID table in the local cache of core 601 may also be updated to reflect the transfer.

In additional embodiments, the address search logic 407 (of FIG. 4) and 611 (of FIG. 6) may be replaced by a side table that tracks the most recently used addresses associated with a given PID, in order to reduce the required cache directory search overhead. Such a side table may be managed in conjunction with the main cache directory, and may be indexed by hashing. The side table may comprise a CAM in some embodiments.

Figure 8:
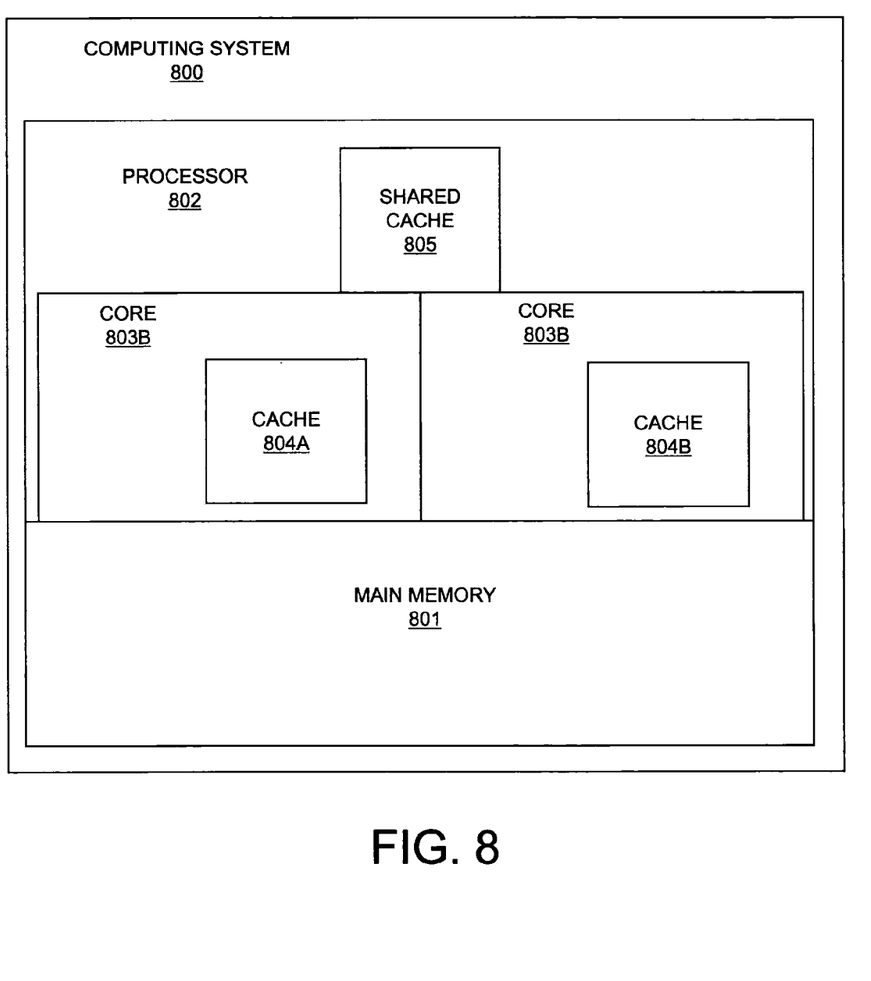
FIG. 8 illustrates a computing system in accordance with an embodiment.

FIG. 8 illustrates an embodiment of a computing system 800 that may be used in conjunction with embodiments of PID-based cache information transfer as described above. Computing system 800 includes main memory 801 and processor 802. Processor 802 includes cores 803A and 803B. Each of cores 803A and 803B include respective local private caches 804A-B. Shared cache 805 as shown in FIG. 8 is shared by cores 803A-B in processor 802; however, in some embodiments, the shared cache 805 may not be present.

Figure 9:
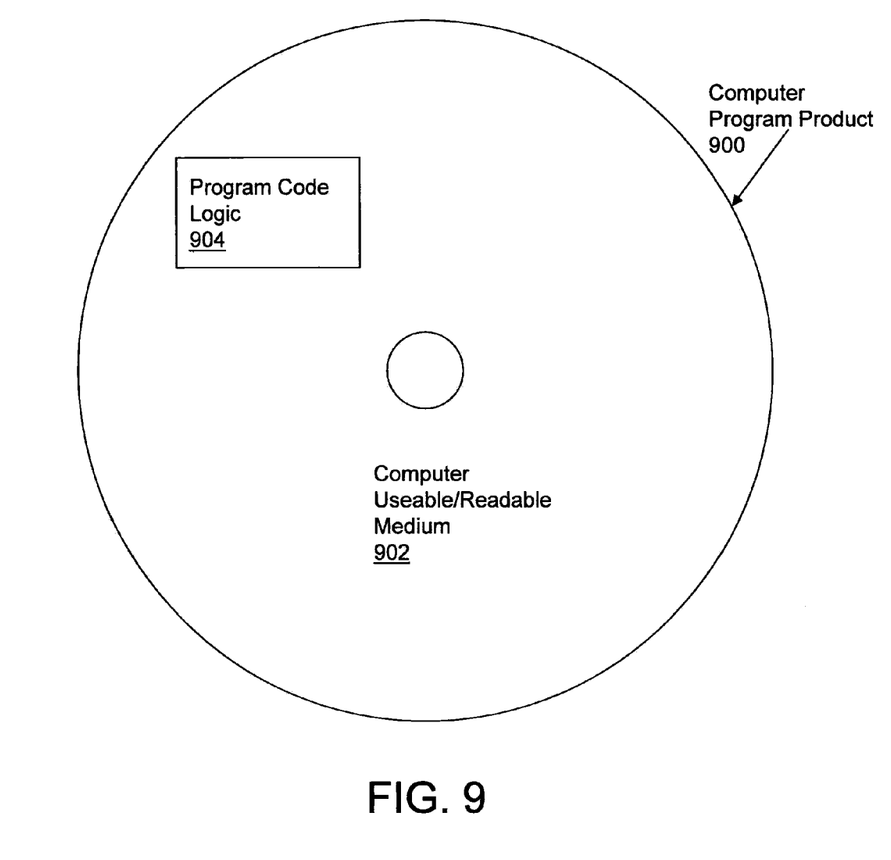
FIG. 9 illustrates a computer program product in accordance with an embodiment.

As described above, embodiments can be embodied in the form of computer-implemented processes and apparatuses for practicing those processes. An embodiment may include a computer program product 900 as depicted in FIG. 9 on a computer readable/usable medium 902 with computer program code logic 904 containing instructions embodied in tangible media as an article of manufacture. Exemplary articles of manufacture for computer readable/usable medium 902 may include floppy diskettes, CD-ROMs, hard drives, universal serial bus (USB) flash drives, or any other computer-readable storage medium, wherein, when the computer program code logic 904 is loaded into and executed by a computer, the computer becomes an apparatus for practicing the invention. Embodiments include computer program code logic 904, for example, whether stored in a storage medium, loaded into and/or executed by a computer, or transmitted over some transmission medium, such as over electrical wiring or cabling, through fiber optics, or via electromagnetic radiation, wherein, when the computer program code logic 904 is loaded into and executed by a computer, the computer becomes an apparatus for practicing the invention. When implemented on a general-purpose microprocessor, the computer program code logic 904 segments configure the microprocessor to create specific logic circuits.

Technical effects and benefits include avoiding cache misses when a process is transferred from a first core to a second core in a multiprocessor system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for process identifier (PID) based cache information transfer, the method comprising:
   sending, by a first core of a processor, a PID associated with a cache miss in a first local cache of the first core to a second cache of the processor;
   determining that the PID associated with the cache miss is listed in a PID table of the second cache;
   based on the PID being listed in the PID table of the second cache, determining a plurality of entries in a cache directory of the second cache that are associated with the PID; and
   pushing cache information associated with each of the determined plurality of entries in the cache directory from the second cache to the first local cache.

2. The method of claim 1, wherein the PID table comprises a content addressable memory.

3. The method of claim 1, wherein each entry in the cache directory comprises an address and an associated PID.

4. The method of claim 3, wherein each entry in the cache directory additionally comprises a core identifier.

5. The method of claim 1, wherein the second cache comprises a second local cache associated with a second core of the processor.

6. The method of claim 1, wherein the second cache comprises a shared cache associated with the first core and a second core of the processor.

7. The method of claim 1, wherein the cache information comprises addresses associated with the determined plurality of entries in the cache directory.

8. The method of claim 7, wherein the cache information additionally comprises a plurality of cache lines associated with the determined plurality of entries in the cache directory from a local storage of the second cache.

* * * * *